United States Patent
Broome et al.

(10) Patent No.: US 11,915,358 B2
(45) Date of Patent: Feb. 27, 2024

(54) METHOD AND SYSTEM FOR SAFETY CRITICAL RENDERING OF A FRAME

(71) Applicant: Imagination Technologies Limited, Kings Langley (GB)

(72) Inventors: Jamie Broome, Hertfordshire (GB); Ian King, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 17/584,808

(22) Filed: Jan. 26, 2022

(65) Prior Publication Data

US 2022/0254087 A1   Aug. 11, 2022

(30) Foreign Application Priority Data

Jan. 26, 2021   (GB) ...................................... 2101013
Jan. 26, 2021   (GB) ...................................... 2101014

(51) Int. Cl.
*G06T 15/00*   (2011.01)
*G06T 1/20*    (2006.01)
*G06T 17/10*   (2006.01)
*G06T 17/20*   (2006.01)

(52) U.S. Cl.
CPC .............. *G06T 15/005* (2013.01); *G06T 1/20* (2013.01); *G06T 17/10* (2013.01); *G06T 17/20* (2013.01)

(58) Field of Classification Search
CPC ................................ G06T 17/10; G06T 17/20
See application file for complete search history.

(56) References Cited

U.S. PATENT DOCUMENTS

| | | | |
|---|---|---|---|
| 2015/0015571 A1* | 1/2015 | Yuda | G06T 15/005 345/419 |
| 2015/0363968 A1 | 12/2015 | Yang | |
| 2016/0379333 A1* | 12/2016 | Krutsch | G06T 15/005 345/506 |
| 2018/0197269 A1 | 7/2018 | Broadhurst et al. | |
| 2021/0158584 A1 | 5/2021 | Chalfin et al. | |

FOREIGN PATENT DOCUMENTS

EP          3745268 A1     12/2020

OTHER PUBLICATIONS

Baek et al., "A Prototype Implementation of OpenGL SC on a Massively-Parallel Architecture," IEEE 33rd Digital Avionics Systems Conference, Oct. 5-9, 2014, pp. 8B4-1-8B4-8.

* cited by examiner

*Primary Examiner* — Samantha (Yuehan) Wang
(74) *Attorney, Agent, or Firm* — Potomac Law Group, PLLC; Vincent M DeLuca

(57) ABSTRACT

A method and system for performing safety-critical rendering of a frame in a tile based graphics processing system. Geometry data for the frame is received, including data defining a plurality of primitives representing a plurality of objects in the frame. A definition of a region in the frame is received, the region being associated with one or more primitives among the plurality of primitives. Verification data is received that associates one or more primitives with the region in the frame. The frame is rendered using the geometry data and the rendering of the frame is controlled using the verification data, so that the rendering excludes, from the frame outside the region, the primitives identified by the verification data.

19 Claims, 12 Drawing Sheets

METHOD AND SYSTEM FOR SAFETY CRITICAL RENDERING OF A FRAME

BACKGROUND

Safety-critical systems are typically those systems whose failure would cause a significant increase in the risk to the safety of people or the environment. In safety-critical systems, at least some of the components of the system must meet safety goals sufficient to enable the system as a whole to meet a level of safety deemed necessary for the system. For example, in most jurisdictions, seat belt retractors in vehicles or vehicle tyres etc. must meet specific safety standards in order for a vehicle provided with such devices to pass safety tests.

Data processing devices often form an integral part of safety-critical systems, either as dedicated hardware or as processors for running safety-critical software. For example, fly-by-wire systems for aircraft, driver assistance systems, railway signalling systems and control systems for medical devices would typically all be safety-critical systems running on data processing devices. Where data processing devices form an integral part of a safety-critical system it is necessary for the data processing device itself to satisfy safety goals such that the system as a whole can meet the appropriate safety level. In the automotive industry, the safety level is normally an Automotive Safety Integrity Level (ASIL) as defined in the functional safety standard ISO 26262.

For example, in the automotive context, graphics processing systems may be used to render a safety critical frame such as an instrument cluster for display at a dashboard display screen. The instrument cluster provides critical information to the driver, such as vehicle speed and details of any faults associated with any systems/components of the vehicle. It is important that such critical information is reliably presented to the driver and vehicle regulations would typically require that the critical information is rendered in a manner which satisfies a predefined safety level, such as ASIL B of the ISO 26262 standard.

To ensure safety of the safety critical systems, both the hardware and software elements must meet specific safety goals. Some software failures can be systematic failures due to programming errors or poor error handling. These issues can typically be addressed through rigorous development practices, code auditing and testing protocols. There can also be various random errors that can be introduced into hardware, e.g. by transient events (e.g. due to ionizing radiation, voltage spikes, or electromagnetic pulses). In binary systems transient events can cause random bit-flipping in memories and along the data paths of a processor. These errors may affect the graphics processing system and rendering of the safety critical frame. There may also be various other reasons which affect the rendering of the safety critical frame.

Hence the current safety critical systems, especially rendering safety critical frames by a graphics processing system, have their own drawbacks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method and system for safely rendering safety critical elements in a graphics processing system is provided herein. Safe rendering of the safety critical elements is performed by preventing the corruption of safety critical geometry data by other corrupted data in the frame.

A first aspect provides a method of performing safety-critical rendering of a frame in a tile based graphics processing system. The method comprises receiving geometry data for the frame, including data defining a plurality of primitives representing a plurality of objects in the frame, receiving a definition of a region in the frame, the region being associated with one or more primitives among the plurality of primitives, receiving verification data that associates one or more primitives with the region in the frame and rendering the frame using the geometry data and controlling the rendering of the frame using the verification data, so that the rendering excludes, from the frame outside the region, the primitives identified by the verification data.

Optionally, the controlling comprises checking, whether a tile comprising primitives identified by the verification data, falls entirely within the region.

Optionally, the checking, is performed by comparing the vertices of the tiles comprising primitives identified by the verification data to the vertices of the define region to identify if the tiles fall within the vertices of the region defined.

Optionally, the geometry data and the verification data are received together and optionally, the verification data is state data.

Optionally, the region is an axis aligned bounding box, within the frame, and optionally, the region is an axis aligned bounding box, aligned to one or more tiles within the frame.

Optionally, the definition of the region in the frame includes location of vertices of the region in the frame.

Optionally, on receiving geometry data for the frame, the method comprises generating one or more primitive blocks, each primitive block comprising one or more primitives among the plurality of primitive grouped together and associating, each tile among a plurality of tiles on the frame, with primitive blocks comprising at least one primitive that falls, at least partially, within the bounds of the tile.

Optionally, controlling the rendering comprises generating a control stream data for each tile among the plurality of tiles on the frame identifying the primitives falling on the tile and excluding from the control stream data, for each tile outside the region, pointers to the primitive blocks comprising primitives identified by the verification data.

Optionally, the geometry data defining a plurality of primitives includes coordinates of vertices of primitives.

Optionally, the primitives that are covered by the region represents multi-dimensional objects.

Optionally, the frame comprises one or more safety critical objects outside the defined region.

Optionally, the verification data is received from an application.

Optionally, the application requests the rendering of the frame.

Optionally, the checking identifies whether the geometry data is corrupted before rendering.

Optionally, the method further comprises receiving definitions of multiple regions. The verification data associates one or more primitives with each of the multiple regions. The method comprises controlling the rendering of the frame using the verification data, excludes, from the frame outside the regions, the primitives identified by the verification data for each region.

Optionally, method further comprises receiving a definition of a second region in the frame, the region being associated with one or more primitives among the plurality of primitives, receiving verification data for the second region that identifies one or more primitives associated with the region in the frame and rendering the frame using the geometry data and controlling the rendering of the frame using the verification data, so that the rendering excludes, from the frame inside the region, the primitives not identified by the verification data.

A second aspect provides a tile based graphics processing system enabling safety-critical rendering of a frame. The system comprises a rendering control unit configured to receive geometry data for the frame, including data defining a plurality of primitives representing a plurality of objects in the frame, receiving a definition of a region in the frame, the region being associated with one or more primitives among the plurality of primitives, receiving verification data that associates one or more primitives with the region in the frame and control the rendering of the frame using verification data, so that the rendering excludes, from the frame outside the defined region, the primitives identified by the verification data. The system comprises a rendering unit configured to render the frame using the geometry data based on the output of the rendering control unit.

Optionally, the rendering control unit comprises a control module configured to check whether a tile comprising primitives identified by the verification data, falls entirely within the region.

Optionally, the rendering control unit comprises a primitive block generator configured to receive the geometry data for the frame and verification data and generate one or more primitive blocks, each primitive block grouping together one or more primitives among the plurality of primitives.

Optionally, the rendering control unit comprises a tiling logic configured to receive the one or more primitive blocks and the geometry data from the primitive block generator and associate each tile among the plurality of tiles on the frame, with primitive blocks that comprises at least one primitive that falls, at least partially, within the bounds of the tile.

Optionally, the rendering control unit comprises a control stream generator configured to generate the control stream data for each tile among the plurality of tiles on the frame to render the image and control the rendering of the frame by excluding from the control stream data, for each tile outside the region, the pointers to the primitive blocks associated with the primitives identified by the verification data.

Optionally, the control module receives the definition of the region in the frame comprising the location of vertices of the region.

Optionally, the rendering control unit receives the definition of the region in the frame from an application.

Optionally, the tile based graphics processing system is embodied in hardware on an integrated circuit.

A third aspect provides computer readable code configured to cause the method according to the first aspect to be performed when the code is run.

A fourth aspect provides a computer readable storage medium having encoded thereon the computer readable code of the third aspect.

A fifth aspect provides a method of manufacturing, using an integrated circuit manufacturing system, a tile based graphics processing system according to the second aspect, the method comprising processing, using a layout processing system, a computer readable description of the graphics processing system so as to generate a circuit layout description of an integrated circuit embodying the graphics processing system and manufacturing, using an integrated circuit generation system, the graphics processing system according to the circuit layout description.

A sixth aspect provides non-transitory computer readable storage medium having stored thereon a computer readable description of a graphics processing system according to the second aspect that, when processed in an integrated circuit manufacturing system, causes the integrated circuit manufacturing system to manufacture an integrated circuit embodying the graphics processing system.

A seventh aspect provides a method of performing safety-critical rendering of a frame in a tile based graphics processing system. The method comprises receiving geometry data for the frame, including data defining a plurality of primitives representing a plurality of objects in the frame, receiving a definition of a region in the frame, the region being associated with one or more primitives among the plurality of primitives, receiving verification data that associates one or more primitives with the region in the frame and rendering the frame using the geometry data and controlling the rendering of the frame using the verification data, so that the rendering excludes, from different portions of the frame, the primitives based on the verification data.

An eighth aspect provides a method of performing safety-critical rendering of a frame in a graphics processing system. The method comprises receiving geometry data for the frame, including data defining a plurality of primitives representing a plurality of objects in the frame, receiving a definition of a region in the frame, the region being associated with one or more primitives among the plurality of primitives, receiving verification data that associates one or more primitives with the region in the frame and rendering the frame using the geometry data and controlling the rendering of the frame using the verification data, so that the rendering excludes, from the frame outside the region, the primitives identified by the verification data.

A ninth aspect provides a method of performing safety-critical rendering of a frame in a tile based graphics processing system. The method comprises receiving geometry data for the frame, including data defining a plurality of primitives representing a plurality of objects in the frame. The method comprises receiving a definition of a region in the frame, the region being associated with one or more primitives among the plurality of primitives. The method also comprises receiving verification data that associates one or more primitives with the region in the frame. Further the method comprises rendering the frame using the geometry data and controlling the rendering of the frame, so that the rendering excludes, from the frame inside the defined region, the primitives that are not identified by the verification data.

A tenth aspect provides a tile based graphics processing system enabling safety-critical rendering of a frame. The system comprises a rendering control unit configured to receive geometry data for the frame, including data defining a plurality of primitives representing a plurality of objects in the frame, receive a definition of a region in the frame, the region being associated with one or more primitives among the plurality of primitives, receive verification data that associates one or more primitives with the region in the frame and control the rendering of the frame, so that the rendering excludes, from the frame inside the defined region, the primitives not identified by the verification data. The system further comprises a rendering unit configured to render the frame using the geometry data based on the output of the rendering control unit.

The graphics processing system may be embodied in hardware on an integrated circuit. There may be provided a method of manufacturing, at an integrated circuit manufacturing system, a graphics processing system. There may be provided an integrated circuit definition dataset that, when processed in an integrated circuit manufacturing system, configures the system to manufacture a graphics processing system. There may be provided a non-transitory computer readable storage medium having stored thereon a computer readable description of a graphics processing system that, when processed in an integrated circuit manufacturing system, causes the integrated circuit manufacturing system to manufacture an integrated circuit embodying a graphics processing system.

There may be provided an integrated circuit manufacturing system comprising: a non-transitory computer readable storage medium having stored thereon a computer readable description of the graphics processing system; a layout processing system configured to process the computer readable description so as to generate a circuit layout description of an integrated circuit embodying the graphics processing system; and an integrated circuit generation system configured to manufacture the graphics processing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
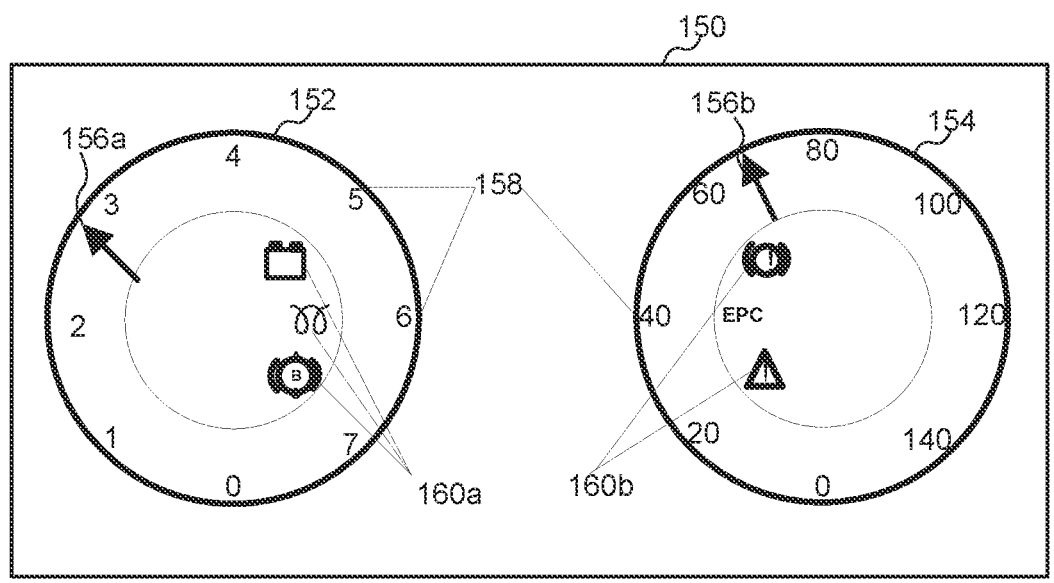
FIG. 1 shows an instrument cluster comprising various critical and non-critical warning lights.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

The present disclosure relates to methods and systems for safety-critical rendering of a frame. The methods described herein can be used in any application wherein a graphics processing system renders one or more safety critical elements in a frame.

An example as discussed above could be graphics processing systems for rendering safety critical elements in an instrument cluster for display at a dashboard display screen.

FIG. 1 illustrates an instrument cluster 150. The instrument cluster 150 comprises two dials including a tachometer (RPM gauge) 152 and a speedometer 154, both in the form of a traditional dial having values 158 around the edge of the dial and having a needle (156*a*, 156*b*) whose angular orientation indicates the current RPM and speed of the vehicle respectively. The instrument cluster 150 further comprises a plurality of warning lights (or tell tale indicators) (160*a*, 160*b*). The plurality of warning lights may include a battery warning indication, ABS warning light, oil temperature gauge, an information icon (e.g. indicating the selected radio station), a non-critical warning icon (e.g. indicating a fault with the air conditioning system), and a critical warning icon (e.g. indicating a serious engine problem) etc. Nowadays, with the complexity of electronic systems in the cars, the traditional mechanical dashboards are replaced by digital displays. The digital display renders a lot more information than conventional dials in a mechanical dashboard. These digital displays can be customized to suit a driver's personal preferences and they are also capable of being adaptive and dynamic, showing exactly the information a driver needs to see at any given moment. Various applications displayed on the digital display such as maps, music, or air conditioning can be user defined based on the user preferences.

While using certain applications, the graphics processing system may render a plurality of objects including multi-dimensional (e.g. 2-D, 3-D) objects on the digital display. An example includes rendering the surrounding of the car while using a navigation application. The graphics processing system renders these objects along with safety critical elements such as a digital instrument cluster showing warning lights on the digital display on the dashboard. Rendering errors become more likely as the render becomes more complicated and uses more memory and keeps the hardware active for longer, so rendering multi-dimensional objects increases the possibility of such an error. Such errors may manifest as a so-called vertex explosion, in which the position of a vertex is rendered incorrectly, thus 'exploding' across, and thus corrupting, the surrounding render.' The explosion of vertices of such object may occur as a result of random errors occurring in the hardware. Even if systematic errors could be completely excluded from a safety-critical system by rigorous development practices, random errors introduced into hardware, such as transient events causing random bit-flipping in memories and along the data paths of a processor, are difficult to eliminate which leaves potential for corruption in the safety critical rendering of a frame.

The multi-dimensional objects rendered on digital display are expensive in terms of performance. However, if they are not safety-related, it is not critical that they are rendered correctly. But the impact of these multidimensional objects on the safety-related objects must be avoided. Typically to ensure that the safety critical elements are rendered correctly, all the geometry in the scene is processed twice and checksums between each pass are compared to validate that the geometry is correct. If these multidimensional objects could be marked as non-safety related, the redundant processing of the draw calls to process these objects could be skipped, thereby improving performance. However, the multidimensional objects might still be susceptible to corruption which may then impact the other safety-related objects in the scene (which are still processed twice).

The inventors devised a method and system for safely rendering safety critical elements in a graphics processing system by preventing the corruption of safety critical geometry data by other corrupted data in the frame. This could be achieved by modifying the existing graphics processing system which is explained in detail later.

Graphics processing systems are configured to receive graphics data, e.g. from an application running on a computer system, and to render an image from the graphics data to provide a rendering output. For example, an application may generate a 3D model of a scene and output geometry data representing the objects in the scene. In particular, the application may represent each object using one or more primitives (i.e. simple geometric shapes, such as, but not limited to rectangles, triangles, lines and points to which a texture can be applied) which are defined by the position of one or more vertices. In these cases, the geometry data output by the application may include information identifying each vertex (e.g. the coordinates of the vertex in world space) and information indicating the primitives formed by the vertices. The graphics processing system then converts the received geometry data into an image that may be displayed on a screen.

A graphics processing system may, for example, implement immediate mode rendering (IMR) or tile based rendering (TBR). In IMR the entire scene is rendered as a whole. In contrast, in TBR a scene is rendered using a rendering space which is divided into subsections, which are referred to as tiles, wherein at least a portion of the rendering process may be performed independently for each tile. The tiles may have any suitable shape, but are typically rectangular (wherein the term "rectangular" includes square). An advantage of TBR is that fast, on-chip memory can be used during the rendering for colour, depth and stencil buffer operations, which allows a significant reduction in system memory bandwidth over IMR, without requiring on-chip memory that is large enough to store data for the entire scene at the same time.

TBR involves two key phases: a geometry processing phase; and a rasterization phase. During the geometry processing phase the geometry data (e.g. vertices defining primitives) received from an application (e.g. a game application) is transformed from world space coordinates into screen space coordinates. A per-tile list is then created of the transformed primitives (e.g. triangles) that, at least partially, fall within the bounds of the tile. During the rasterization phase each tile is rendered separately (i.e. the transformed primitives are mapped to pixels and the colour is identified for each pixel in the tile). This may comprise identifying which primitive(s) are visible at each pixel. The colour of each pixel may then be determined by the appearance of the visible primitive(s) at that pixel which may be defined by a texture applied at that pixel and/or the pixel shader program run on that pixel. A pixel shader program describes operations that are to be performed for given pixels. Rendering each tile separately enables the graphics processing system to only retrieve the transformed primitive data related to a particular tile when rendering that tile in the rasterization phase, which keeps bandwidth requirements for the memory (e.g. intermediate buffer) low. Once a colour value has been identified for each pixel in a tile the colour values for the tile are written out to memory (e.g. a frame buffer). Once the entire scene has been rendered (i.e. once colour values have been determined for the pixels of all of the tiles) the scene may be, for example, displayed on a screen.

Figure 2:
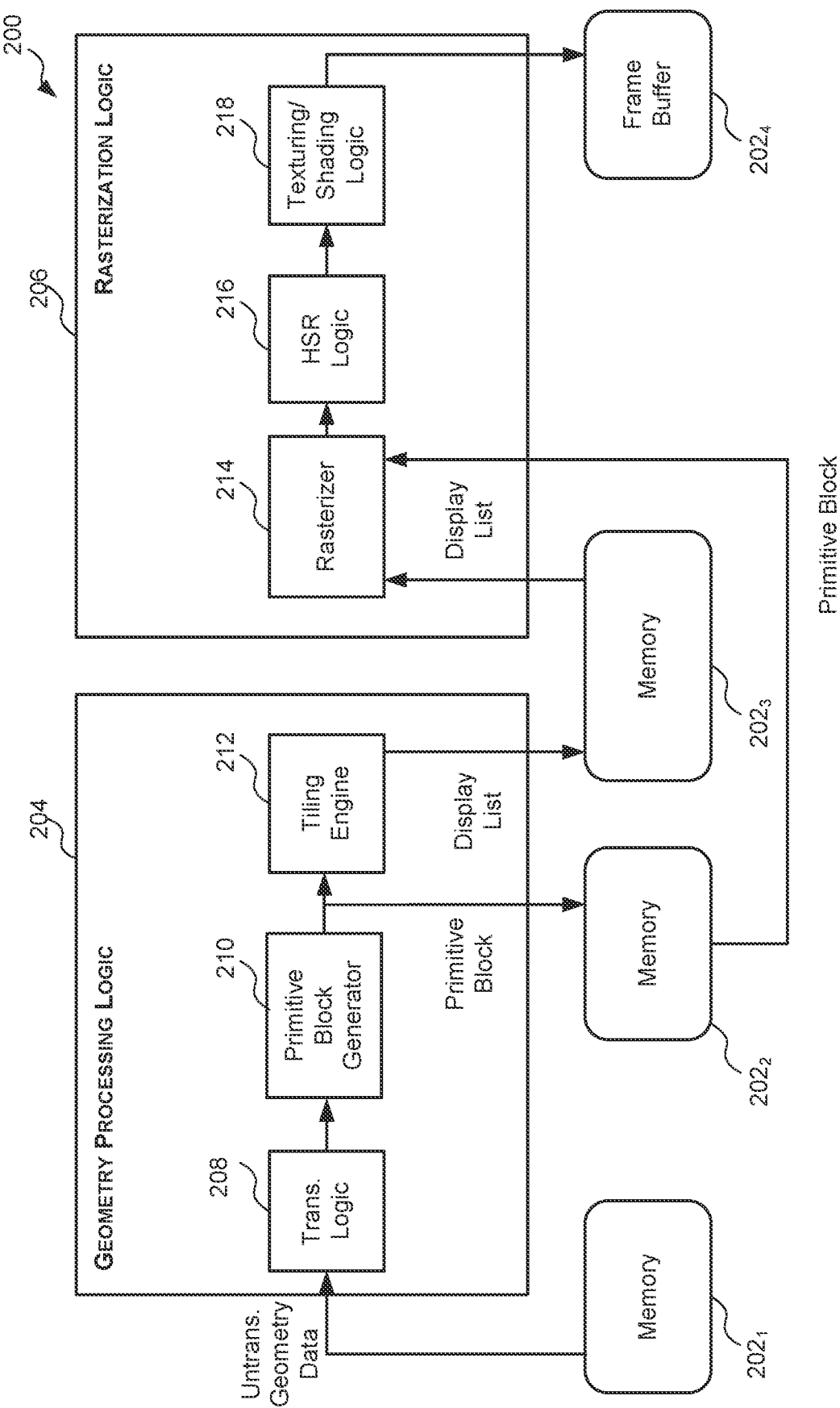
FIG. 2 illustrates an example tile based graphics processing system.

FIG. 2 illustrates an example TBR graphics processing system 200. The system 200 comprises memory $202_1$, $202_2$, $202_3$, $202_4$, geometry processing logic 204 and rasterization logic 206. Two or more of the memories $202_1$, $202_2$, $202_3$, $202_4$ may be implemented in the same physical unit of memory.

The geometry processing logic 204 implements the geometry processing phase of TBR. The geometry processing logic 204 comprises transformation logic 208, a primitive block generator 210, and a tiling engine 212. The transformation logic 208 receives geometry data (e.g. vertices, primitives and/or patches) from an application and transforms the geometry data into the rendering space (e.g. screen space). The transformation logic 208 may also perform functions such as clipping and culling to remove geometry data (e.g. primitives or patches) that falls outside of a viewing frustum, and/or apply lighting/attribute processing as is known to those of skill in the art.

The primitive block generator 210 stores the transformed primitives (i.e. the transformed geometry data related thereto) in memory $202_2$ in primitive blocks. A primitive block is a data structure in which one or more primitives (e.g. the transformed geometry data related thereto) are stored together. Storing the primitives in primitive blocks may allow the transformed geometry data for a set of primitives to be stored more efficiently in memory $202_2$. Specifically, the transformed geometry data for a primitive often comprises transformed vertex information for a plurality of vertices where the vertices are shared between (or are common to) multiple primitives. Accordingly, where multiple primitives in the same primitive block share a vertex the data related to that vertex only needs to be stored once in the primitive block.

The transformed primitives may be grouped into primitive blocks using any suitable method or technique. For example, in some cases the transformed primitives may be grouped into primitive blocks based on the order in which the transformed primitives arrive at the primitive block generator 210. In these cases, each primitive block may have a maximum size (e.g. in terms of bits or bytes), a maximum number of primitives which can belong to a primitive block, and/or a maximum number of vertices that can belong to a primitive block and the primitive block generator 210 may be configured to add primitives to a current primitive block until one or more of the maximums is reached. In other cases, the primitives may be grouped into primitive blocks based on their location in the render space so that spatially similar primitives are in the same primitive block.

Figure 3:
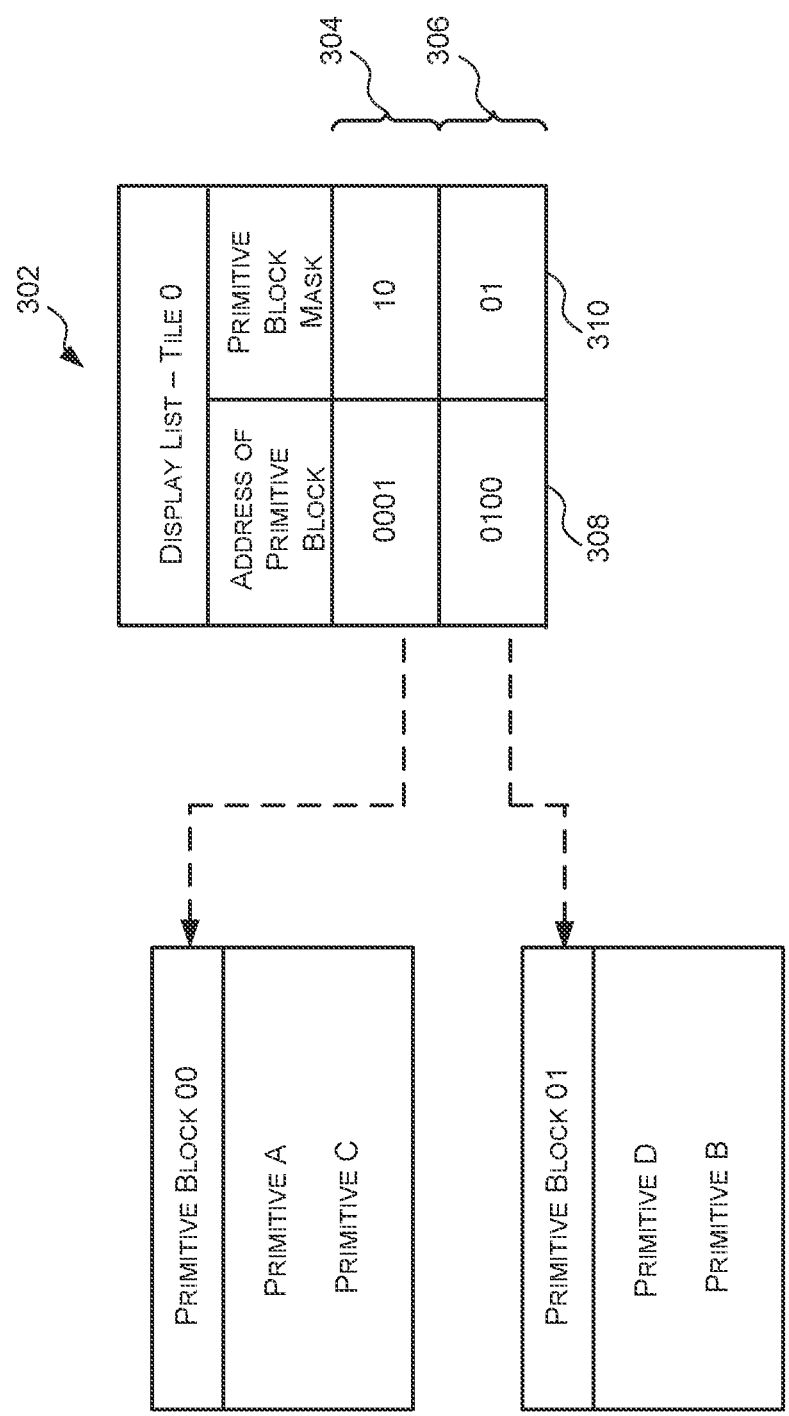
FIG. 3 shows an example display list (also known as tile control stream) for a tile.

The primitive blocks along with information identifying the location of the primitive blocks in memory are provided to the tiling engine 212. The tiling engine 212 generates, from the transformed geometry data, a list, for each tile, of the transformed primitives that fall, at least partially, within that tile. The list may be referred to as a display list or a transformed display list or a tile control stream. In some cases, the transformed display lists may comprise pointers or links to the transformed geometry data (e.g. vertex data) related to the primitives that, at least partially, fall within the tile. For example, FIG. 3 shows an example display list (also known as tile control stream) 302 for a tile which comprises a primitive block entry 304, 306 for each primitive block that comprises at least one primitive that falls, at least partially, within the bounds of that tile. Each primitive block entry 304, 306, comprises information 308 identifying the location of the primitive block in memory (e.g. an address of the primitive block in memory) and information 310 identifying which primitives of that primitive block fall, at least partially, within the bounds of the tile. As shown in FIG. 3 the information identifying which primitives of the primitive block fall, at least partially, within a tile may be in the form of a mask that comprises a bit for each primitive in the primitive block that indicates whether or not that primitive falls, at least partially, within the bounds of the tile.

Returning to FIG. 2, the rasterization logic 206 implements the rasterization phase of TBR. Specifically, the rasterization logic 206 renders the primitives in a tile-by-tile manner by fetching the display list for a tile from memory $202_3$ and then fetching the transformed geometry data from memory $202_2$ for the primitives that fall within the tile as indicated by the display list for that tile; and rendering the primitives for that tile based on the transformed geometry data.

In some cases, the rasterization logic 206 may comprise a rasterizer 214, hidden surface removal (HSR) logic 216 and texturing/shading logic 218. In these cases, the rasterizer 214 fetches each of the display lists from memory $202_3$ and for each display list fetches the transformed geometry data from memory $202_2$ for the primitives that fall within a tile as specified by the corresponding display list, and converts each primitive into a set of primitive fragments. The term "fragment" is used herein to mean a sample of a primitive at a sampling point, which is to be processed to render pixels of an image. In some examples, there may be a one-to-one mapping of pixels to fragments. However, in other examples there may be more fragments than pixels, and this oversampling can allow for higher quality rendering of pixel values, e.g. by facilitating anti-aliasing and other filters that may be applied to multiple fragments for rendering each of the pixel values.

The primitive fragments for a particular tile are then provided to the HSR logic 216 which removes primitive fragments which are hidden (e.g. hidden by other primitive fragments) by performing depth testing on the primitive fragments. The remaining fragments (after hidden surface removal) are then passed to the texturing/shading logic 218 which performs texturing and/or shading on the primitive fragments to determine pixel values of a rendered image. The rendered pixel values for a tile are then stored in memory $202_4$ (e.g. frame buffer).

The rasterization logic 206 processes each of the tiles and when the whole image has been rendered and stored in the memory $202_4$ (e.g. frame buffer) the image can be output from the graphics processing system 200 and used in any suitable manner, for example, displayed on a display, stored in memory, or transmitted to another device, etc. The TBR graphics processing system 200 shown in FIG. 2 is a "deferred" rendering system in the sense that fragments are processed by the HSR logic 216 before being processed by the texturing/shading logic 218. In other examples, the graphics processing system might not be a deferred rendering system in which case texturing/shading would be applied to fragments before HSR is applied to those fragments.

Although the geometry processing logic is shown in the figures as being separate to the rasterization logic, in some implementations the geometry processing logic and the rasterization logic may share some resources. For example, the graphics processing system could use a unified shading approach wherein the same physical execution units can be used to execute instructions for use in the geometry processing phase (e.g. to perform vertex processing) and to execute instructions for use in the rasterization phase (e.g. to perform fragment processing).

Thus, we obtain two types of data structures during the geometry processing phase. One which is a primitive block comprising the vertex data of the primitives and another which is a tile control stream comprising the primitive blocks associated with a tile and the information of the primitives that fall within the bounds of the tile.

The inventors devised that by modifying the functionality of the tiling engine 212, to control the generation of the tile control stream, the safety critical elements in a frame can be safely rendered without any corruption. This can be achieved by different implementations.

One way of achieving this is by defining a region around the elements that need to be protected. The region is associated with one or more primitives of one or more objects in the frame. In this implementation, the data regarding the definition of the region is provided as an input to a tiling engine in the graphics processing system. The tiling engine, on receiving the definition of the region, is capable of controlling the rendering of the frame based on verification data that associates one or more primitives with the region in the frame, thereby safely rendering the safety critical elements. The purpose of the verification data is to identify the primitives associated with the defined region so that the output of the tiling can be checked, and thus the rendering controlled. Alternatively, this can also be achieved by defining a region around the elements that would potentially corrupt the scene in the frame. The tiling engine, on receiving the definition, is configured for controlling the rendering of the frame based on the verification data that associates one or more primitives with the region in the frame, thereby safely rendering the safety critical elements. Both these implementations are described in detail below with respect to FIG. 4.

The region can be defined when in many different ways. The region can be defined earlier before the entire process starts or can be dynamically defined when an application is run. In some cases, the region could be user defined i.e. pre-set by a programmer. In some other cases, the region could be dynamically defined by an application providing data to the geometry processing logic. In both scenarios, the application may output the region in a screen space as any shape, for example a pixel aligned bounding box or as a tile aligned bounding box. Also in some cases, a plurality of regions comprising different objects in the frame may also be given as an input to the geometry processing logic. The defined region may be provided to the tiling engine as the definition of a bounding box, such as the vertex coordinates of the bounding box. In some scenarios the definition may be provided to graphic processing system in any shape and the system converts it to a tile aligned bounding box.

As such, in general, the bounding box may be generated at any granularity or resolution. For example, in some cases, the bounding box may be at the X and Y coordinate resolution (i.e. the bounding box may be defined by the maximum and minimum X and Y coordinates of the vertices of a particular item, or a particular set of items, of geometry). In other cases, the bounding box may be at the tile resolution (i.e. the closest tile edges that encompass the relevant item(s) of geometry). As mentioned earlier the tiles could be 32×32 tiles in the screen space.

Consider the example in FIG. 1 of the instrument cluster 150 comprising two dials, with each dial including a plurality of warning lights (160*a*, 160*b*) within an area (shown as a circle) within each dial. There could be any number of warning lights within this area. As discussed above, when a frame comprising the image of the instrument cluster 150 is rendered, it is very important to render the safety critical elements in the frame safely without any corruption. Thus, while rendering the frame of the instrument cluster 150, a region in the frame is defined to protect the safety critical elements in the frame.

Figure 5A:
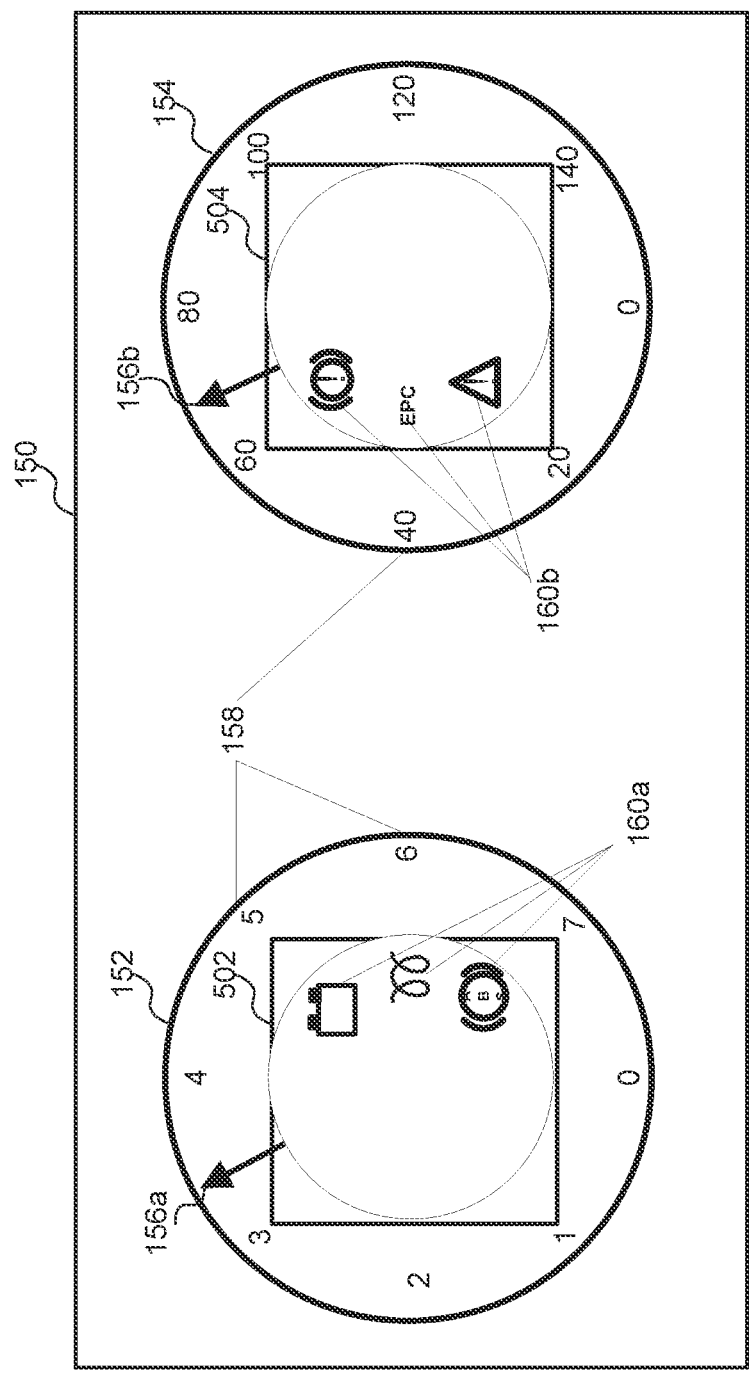
FIGS. 5*a* and 5*b* shows regions defined by the user to enable safety critical rendering of a frame.
Figure 5B:
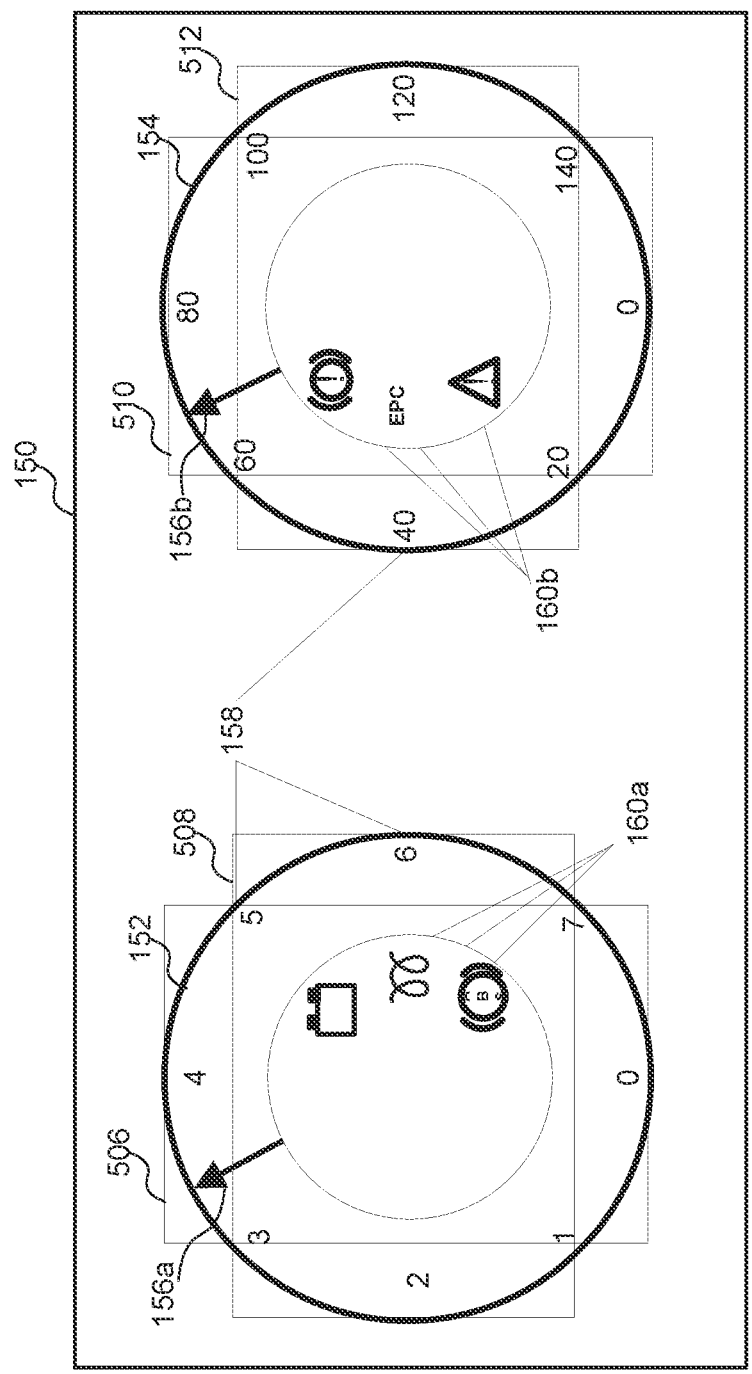

Examples of the defined region are shown with reference to FIG. 5*a* and FIG. 5*b*. In the example shown in FIG. 5*a*, the defined region includes the area containing the plurality of warning lights within each dial. A first region is defined such that the first region is an area (represented by the circle) that surrounds/encloses the plurality of warning lights 160*a* within the dial 152. The first region is delineated by the boundaries (or vertices) of a bounding box 502. Similarly, a second defined region includes the area that surrounds the plurality of warning lights 160*b* within the dial 154. The second defined region is delineated by the boundaries of a second bounding box 504. Any number of regions could be defined in a frame. Further any number of bounding boxes may be used to delineate each region. Here, two regions are defined, and each region is delineated by a bounding box around the region. The boxes 502 and 504 in FIG. 5*a* are square shaped boxes.

In the example shown in FIG. 5*b*, each dial within the instrument cluster 150 is contained within a defined region. A first region surrounds the dial 152. The first region is delineated using two bounding boxes 506 and 508. Similarly, a second region surrounds the dial 154. The second region is delineated using two bounding boxes 510 and 512. Here, two regions are defined, and each region is delineated by drawing two boxes fitted around each region. The boxes in FIG. 5*b* are rectangular shaped boxes. The regions can be defined by using any shapes.

In this case, the first region and the second region are delineated by boxes that (in combination) tightly fit around the area to be protected. The regions could also be defined by individual bounding boxes which more loosely fit around the area to be protected. Further, the regions can be defined by any shapes or any number of shapes. Preferably, the regions are defined by Axis Aligned Bounding Boxes (AABBs) which (in combination) are aligned to the tile boundaries of the screen space.

Figure 4:
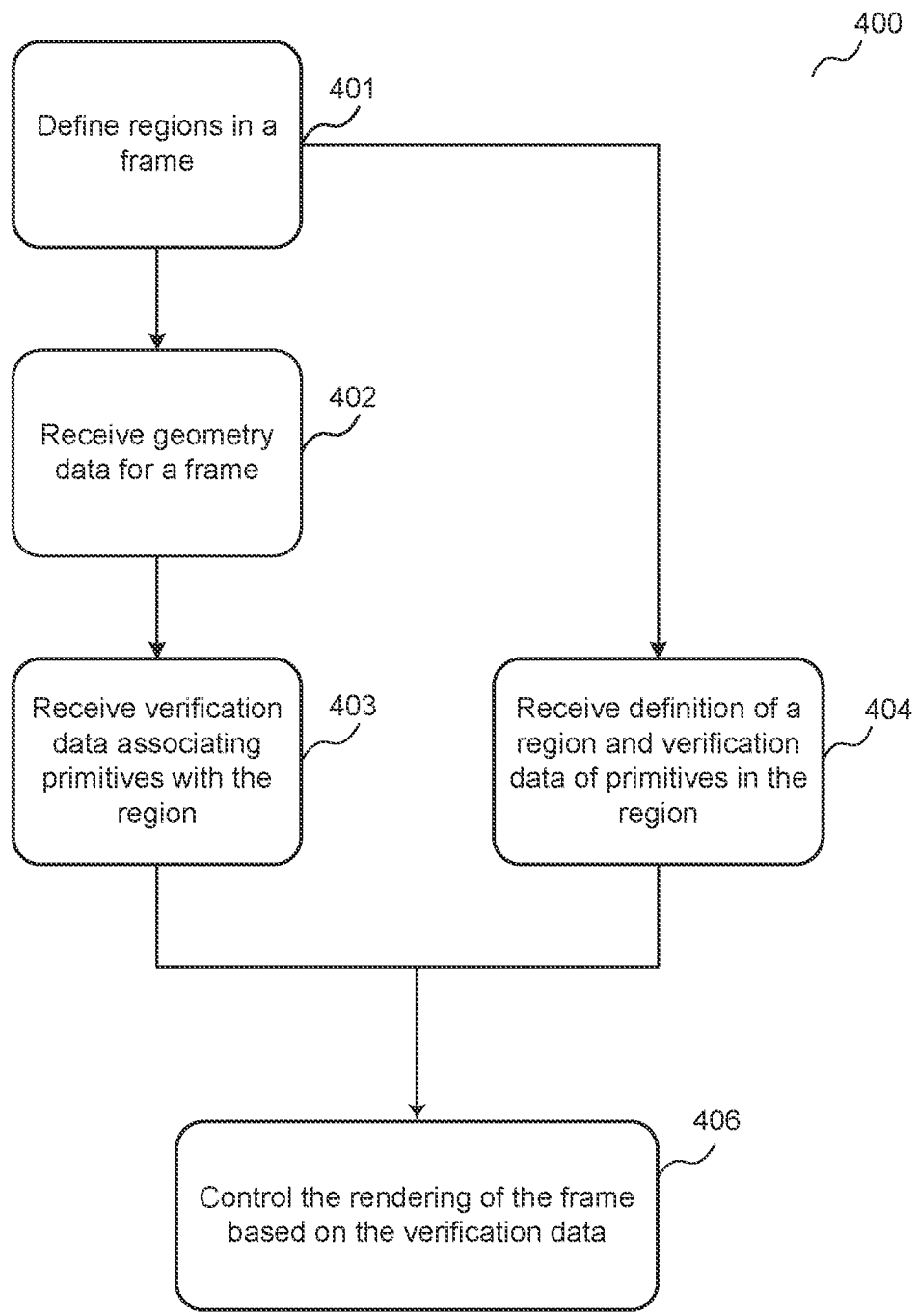
FIG. 4 illustrates a method of performing safety critical rendering of a frame by a graphics processing system.

FIG. 4 illustrates a method of performing safety critical rendering of a frame in a graphics processing system based on a region defined as discussed above. The graphics processing system may implement immediate mode rendering (IMR) or tile based rendering (TBR) of a frame. The method could be used in both IMR or TBR implementation but preferably in a TBR based graphics processing system as the method can be easily integrated into the existing tile based rendering technique when the region matches with the boundaries of the tiles on a screen space of a TBR based graphics processing system.

Figure 6:
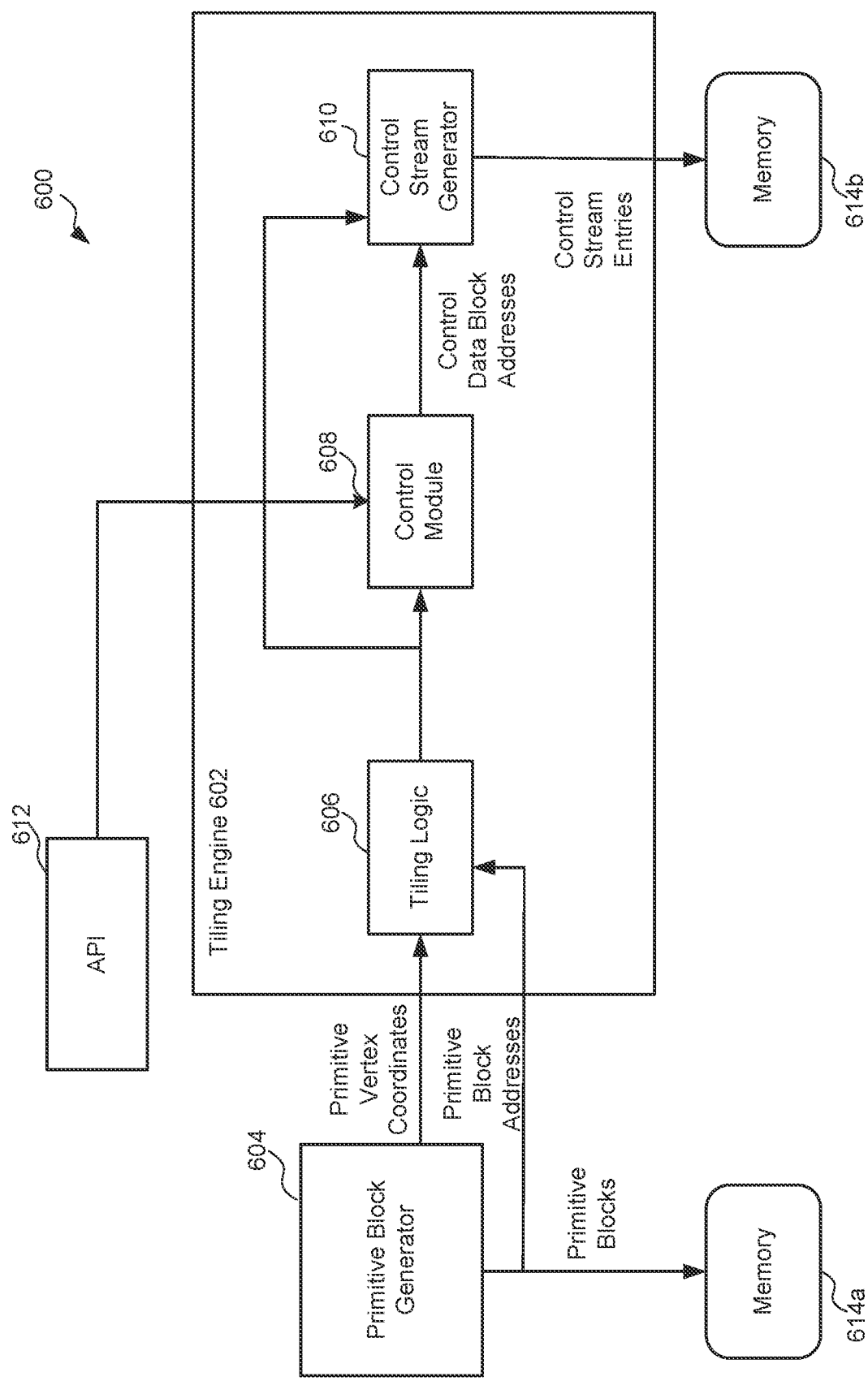
FIG. 6 is a block diagram of a tiling engine in a graphics processing system configured to perform safety critical rendering of a frame.

This method could be implemented by modifying the tiling engine in FIG. 2 as shown in FIG. 6. FIG. 6 illustrates part of a graphics processing system 600 comprising a modified tiling engine 602 receiving inputs from a primitive block generator 604 and an application program interface (API) 612. All the components other than the tiling engine of the graphics processing system work in the same manner as described in FIG. 2. Similarly, the components of the rasterization logic (not shown in FIG. 6) work the same way as the components of rasterization logic 206 shown in FIG. 2.

The method 400 of performing safety-critical rendering of a frame in a tile based graphics processing system, is explained in detail herein with reference to FIG. 4 and FIG. 6. The frame may comprise a plurality of objects of which some of the objects represents safety critical elements. The method optionally includes a step 401 for defining regions in a frame. As discussed earlier, this step could be done before the process starts such that the regions could be user defined i.e. pre-set by a programmer. In other cases, the regions could be dynamically defined by an application. Examples of the application include but are not limited to a game application or a navigation application etc. The application may represent each object in a frame by using a plurality of primitives. The application may associate one or more primitives among the plurality of primitives with each region.

At step 402, the method includes receiving, by a graphic processing system, geometry data for a frame from an application. The primitives could be of any shape including but not limited to a rectangle, a square or a triangle. Receiving geometry data for the frame, includes receiving data defining the plurality of primitives representing the plurality of objects in the frame. The received geometry data may comprise data regarding primitives associated with different objects, vertices of each primitives etc. The received geometry data is processed by a geometry processing logic in a graphics processing system.

The method also includes at step 403 receiving verification data that associates one or more primitives of one or more objects with each region defined in the frame. Examples of verification data include state data, primitive tags and the like. Conventionally, state data comprises drawing modes, textures, shader programs, etc. of each primitive. According to the present disclosure, the one or more primitives associated with a particular region share a common state data indicative of the primitives' association with the particular region. In some cases, the geometry data and the verification data may be received by the geometry processing logic separately and the steps 402 and 403 can happen in any order. In some other cases, the geometry data and verification data may be received by the geometry processing logic simultaneously. The geometry processing logic comprises transformation logic (not shown in FIG. 6), a primitive block generator 604, and a tiling engine 602. The geometry processing logic of the graphics processing system 600 may also be referred to as the rendering control unit as the output of the geometry processing logic is used for controlling the rendering of the frame as described in detail herein.

The transformation logic (not shown in FIG. 6) and the primitive block generator 604 of the graphics processing system 600 corresponds to the transformation logic 208 and the primitive block generator 210 of the graphics processing system 200. The transformation logic and the primitive block generator function in the same manner as explained in detail with reference to FIG. 2. As mentioned earlier, the transformation logic receives geometry data from an application and transforms the geometry data into the rendering space (e.g. screen space).

The primitive block generator 604 generates one or more primitive blocks for storing the primitives transformed by the transformation logic in a memory. A primitive block is a data structure in which data defining one or more primitives are stored together. The transformed primitives among the plurality of primitives may be grouped into primitive blocks using any suitable method or technique as explained earlier. Preferably the primitives may be grouped into primitive blocks based on their location in the render space so that spatially similar primitives are in the same primitive block.

In some cases, the primitives may be grouped into primitive blocks based on the state data of the primitives. The primitive block may comprise a header which includes state data which is used to interpret the primitives included in the primitive block. The format of the data in the primitive block may be of the same as the format of the data in the primitive block 300 described above in relation to FIG. 3.

The primitive blocks generated are stored in a physical memory 614a (such as a parameter buffer). The memory 614 corresponds to the memory $202_2$ shown in FIG. 2. The geometry data including the vertex coordinates of the primitives and the primitive blocks addresses identifying the location of the primitive blocks in memory are provided to the tiling engine of the geometry processing logic. This step is also known as vertex processing phase of the graphics processing system.

At step 404, the method includes a tiling engine 602 receiving a definition of a region. The tiling engine may use the definition of the region to check whether primitives identified by the verification data fall inside/outside the defined region thereby allowing a consistency check with the actual geometry being rendered inside/outside of the corresponding region. The method allows for the region to be defined through the application providing the geometry data to the geometry processing logic.

As discussed earlier, the region could be of any shape. In cases, where a tile based graphics system is optimised to work with defined regions aligned to tile boundaries, an intermediate software driver may convert the shape of the region (such as a pixel aligned bounding box) to a tile aligned bounding box to be used in the tile based graphics processing system. Such optimised systems, which can fully integrate the verification step with the generation of the tile control streams, are considered in more detail in the examples below. Still, in other cases, where a tile based graphics system is configured to accept defined regions that do not align to tile boundaries, such an intermediate software driver may not be required. Similarly, if the method is implemented in a graphics processing system other than a tile based graphics processing system, the pixel aligned bounding box (or other shape) defining the region could also be provided directly to the graphic processing system. In other words, the graphics processing system may receive the definition of the region directly from the API, or via an intermediary software driver.

On receiving the definition of the region, at step 406, the method includes controlling the rendering of the frame based on the definition of the region and verification data by the tiling engine 602.

The method of controlling the rendering of the frame by the tiling engine 602 is explained with reference to FIG. 6. The tiling logic 602 of the graphics processing system 600 performs the rendering control of the geometry processing logic as the output of the tiling logic is used for controlling the rendering of the frame as described in detail herein.

The tiling engine 602 as shown in FIG. 6 comprises a tiling logic 606, a control module 608 and a control stream generator 610. The tiling logic 606 receives input from the primitive block generator 604. The tiling logic 606 is configured to (i) receive a plurality of primitive blocks as described above wherein each primitive block comprises one or more primitives and the geometry data such as vertex coordinates of the primitives (ii) determine, for each received primitive block, which primitives of that primitive block, fall, at least partially, within the bounds of each of the tiles within a region (this may be referred to herein as tiling the primitives); and (iii) output the results of the determination.

The tiling logic 606 may use any suitable method for determining whether a primitive falls, at least partially, within the bounds of a tile. For example, in some cases the tiling logic 606 may use a simple, less accurate, method, such as a simple bounding box tiling method, to determine whether a primitive, at least partially, falls within a tile so as to quickly sort the primitives into tiles. As is known to those of skill in the art, in a bounding box method a bounding box that encompasses the primitive is identified (e.g. the smallest axis-aligned bounding box that encompasses the vertices of the primitive). The bounding box may be generated using any suitable method. For example, the tiling logic 606 may generate a bounding box by finding the minimum and maximum X and Y coordinates of the vertices of the primitive and forming an axis-aligned bounding box from those coordinates. Again, the bounding box may be generated at any granularity or resolution. For example, in some cases, the bounding box may be at the X and Y coordinate resolution (i.e. the bounding box may be defined by the maximum and minimum X and Y coordinates of the vertices). In other cases, the bounding box may be at the tile resolution (i.e. the closest tile edges that encompass the primitive).

Once the tiling logic 606 has identified a bounding box for a primitive, the tiling logic 606 may determine that the primitive, at least partially, falls within a tile if the bounding box at least partially overlaps with the tile. In other words, a primitive may be determined to, at least partially, fall within a tile if the bounding box for that primitive, at least partially, falls within the bounds of the tile. While a bounding box method can be used to quickly and efficiently determine whether a primitive, at least partially, falls within a tile, it is not 'perfect' tiling as the bounding box is often larger than the primitive which may result in a primitive being determined to be in a tile when in fact it is not in the tile. The output of the determination from the tiling logic 606 is provided to a control module 608.

The control module 608 of the tiling engine 602 further receives input from the API 612 (possibly via a software driver). As discussed above, the control module 608 thus receives the boundaries (or location of vertices) of the bounding boxes of defined regions (preferably AABBs). In some cases where multiple regions are defined in the frame, the method includes receiving the definition of one or more regions enabled for protection. In an example the control module 608 receives the indication of the enabled region via draw calls which are illustrated below.

The control module also receives verification data. The purpose of the verification data is to identify the primitives associated with the defined region (or the defined regions, if multiple regions are enabled). In other implementations, the verification data may be obtained directly from the application via the API to the software driver (e.g. through a sequence of functional calls or commands issued by the software). In other implementations, the verification data can be in the form of primitive state data indicating an association of the primitives with the defined region. That state data (i.e. verification data) can be obtained from the primitive block generator. The verification data could be either passed from the primitive block generator through the tiling logic or directly to the control module. Also, the verification data can be inferred from the primitive blocks stored in the memory.

The control module 608 performs the rendering control functionality in the tiling engine 602. The control module 608 is capable of controlling the rendering of the frame by controlling the generation of the tile control stream based on the inputs received. The tile control stream is generated by a control stream generator 610 based on the input received from the control module 608.

Though the tiling engine 602, in the description herein, comprises tiling logic 606, control module 608 and the control stream generator 610 as three separate modules performing tiling, control and generation of control stream, alternatively this could be achieved by implementing a single module in the tiling engine or by tiling engine itself. The tiling engine in such case would receive the geometry data, the verification data and the primitive blocks from the primitive block generator as an input and the definition of the region as another input. The tiling engine may be configured to perform tiling, controlling and generating a new control stream so as to control the rendering of the frame as discussed in detail herein.

The control module 608 obtains the list of primitives falling within each tile from the input obtained from the tiling logic 606 The determination of primitives falling within each tile by the tiling logic 606 could be incorrect based on the actual image to be rendered, if any corruption has occurred while processing the geometry data in the graphics processing system. There could be many reasons such as random errors introduced into hardware, e.g. by transient events (e.g. due to ionizing radiation, voltage spikes, or electromagnetic pulses or by random bit-flipping in memories) and along the data paths of a processor which causes the corruption of geometry data. An example of corruption occurring to geometry data would include vertex explosion of primitives of multi-dimensional objects within the frame to be rendered. Multi-dimensional objects such as high polygon models (such as 3D and higher dimensions) are more prone to corruption compared to 2D objects due to the increased number of vertices being processed.

As mentioned earlier, the method 400 can be implemented in two conceptually different ways to prevent the corruption of the geometry data.

In a first implementation a region that may cause the corruption (for example a high polygon model) of the scene hereinafter referred to as inclusive region is received by the tiling logic. In the case where multiple regions are pre-defined, the tiling logic may receive the indication of a particular region and the type of test as inclusive. In this case, the control module 608 controls the rendering of the frame and prevents corruption outside of the defined region by including the primitives from the defined region (as represented by the verification data) only in the tile control stream for tiles determined to be in the defined region. The controlling of the rendering comprises checking whether a tile comprising any primitives identified by the verification data falls within the region.

The checking is performed by comparing the vertices of the defined region to the vertices of the tiles comprising primitives identified by the verification data as being within the defined region, to identify if the tiles fall within the vertices of the region defined. Thus, if the tiles (comprising primitives identified by the verification data as being within the defined region) are identified to fall within the defined region, then the pointers or reference of the primitives are not removed from the tile control stream for that tile. However, if a tile (comprising primitives identified by the verification data as being with the defined region) is identified to fall outside the defined region, the pointers or reference of those primitives identified by the verification data are removed from those tiles In other words, primitives included in the verification data for the defined region are prevented from being rendered outside the defined region. So, if an error during the tiling process would otherwise lead to a primitive from inside the defined region being erroneously included in a control stream for outside the defined region, the control module can use the verification data to prevent that from happening. Thus, the control module 608 in the tiling engine enables controlling the rendering of the frame, so that the rendering excludes, from the frame outside the defined region, the primitives identified by the verification data.

Figure 7A:
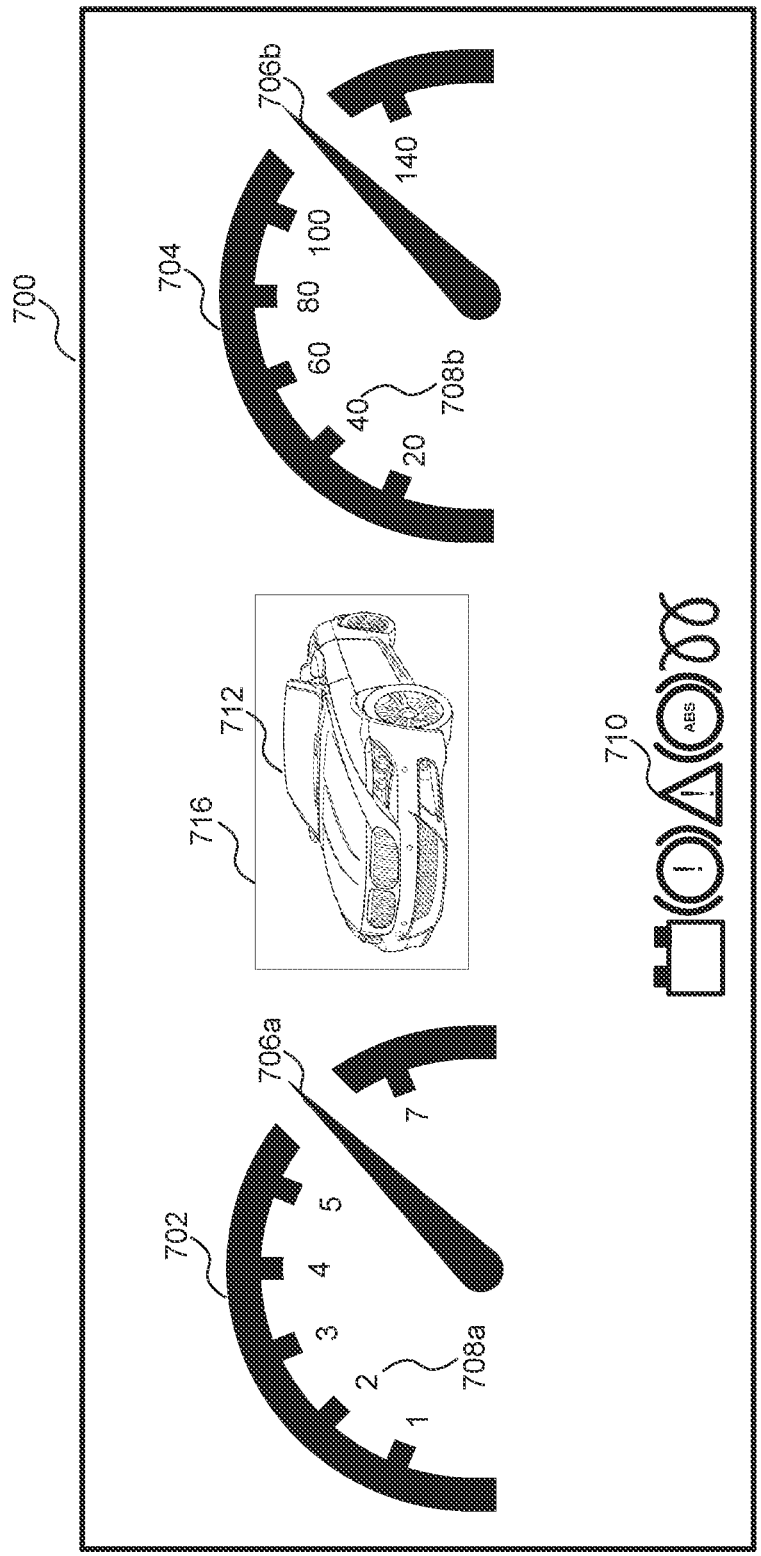
FIG. 7*a* illustrates a digital instrument cluster with an inclusive region defined.

To better understand the first implementation, consider the example given in FIG. 7*a*.

FIG. 7*a* illustrates a digital instrument cluster 700 comprising two dials including a tachometer (RPM gauge) 702 and a speedometer 704, both having values (708*a* and 708*b*) around the edge of the dial and a needle (706*a*, 706*b*) whose angular orientation indicates the current RPM and speed of the vehicle respectively. The digital instrument cluster 700 further comprises a plurality of warning lights 710 and a 3D model of a car 712. The plurality of critical lights include but are not limited to battery, ABS warning light, oil temperature gauge, an information icon, a non-critical warning icon, and a critical warning icon etc.

As mentioned earlier, there could be an error in the output of the tiling logic 606 provided to a control module 608, such as a vertex explosion of a primitive. High polygon models such as the 3D model of the car as shown in FIG. 7*a* are more prone to such errors, as there are more vertices being processed to render those models. Hence in FIG. 7*a*, a region 716 enclosing the 3D model of the car 712 is defined as an inclusive region. For simplicity only one region 716 is shown in FIG. 7A, but there could be multiple regions defined in the frame. An error caused due to a vertex explosion can be prevented from extending across the critical elements in the frame, outside the defined region, based on the verification data. As discussed later, the render within the defined region may still be incorrect, but that incorrect render is prevented from spreading outside the defined region to the safety critical elements.

The control module 608 receives the determination of the primitives falling within each tile as one input and the defined region as a second input. The control module 608 checks the output of the tiling logic 606 for each tile to determine if tiles, to which the primitives represented by the verification data are allocated by the tiling logic, fall entirely within the defined region. In other words, the control module 608 checks the output of the tiling logic 606 to determine if the tiles (comprising primitives represented by the verification data) fall outside the defined region. If the control module identifies that any tile comprising primitives identified by the verification data falls outside the defined region, the control module 608 removes that primitive from the list of primitives allocated to the tiles outside the defined region. In another case, when the control module 608 identifies that any tile comprising primitives in the geometry data represented by the verification data falls outside the defined region, the control module 608 may generate a new list of primitives for the tiles outside the defined region, not including those primitives represented by the verification data. The control module includes those primitives represented by the verification data only in the list of primitives allocated to the tiles inside the defined region. The output of the control module including the list of primitives falling within each tile is provided to the control stream generator module 610.

Figure 8:
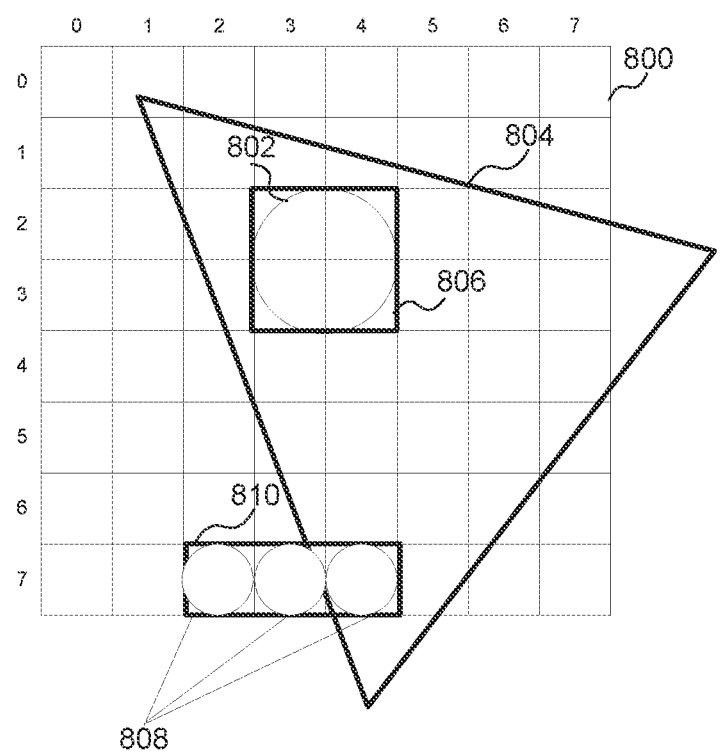
FIG. 8 illustrates a plurality of tiles in a screen space which is rendered using the renderer.

For example, FIG. 8 illustrates an example of a screen space 800 which is to be rendered using the renderer. The screen space 800 is divided into a plurality of tiles. The primitives of a plurality of objects are mapped to the plurality of tiles in the screen space 800.

In FIG. 8, the circles 802 and 808 represent the primitives of the actual objects in the geometry data mapped to the screen space 800. The circle 802 represents the primitives of the 3D model of the car 712 and the circles 808 represent the primitives of the plurality of warning lights 710. In the example, an error at some point during the earlier stages of the tiling means that one or more vertex of any primitives of the 3D model of the car 802 explodes and spreads across the tiles. The area covering the vertices of the primitives of the 3D model of the car 802, after corruption, is represented by the triangle 804. In this case, triangle 804 could represent a situation where all three vertices of one primitive have exploded, although in practice only one vertex might explode or multiple explosions might originate from different primitives. It can be seen that triangle 804 undesirably covers some of the circles 808 (representing the primitives of the plurality of warning lights 710).

As mentioned in FIG. 7*a*, the control module 608 receives the determination of the primitives falling within each tile, provided as an input from the tiling logic 606. As the vertices of the primitive of the 3D model exploded, the output of the tiling logic received by the control module 608 would comprise the primitives of the car 712 in all the tiles covered by the triangle 804 including the tiles comprising the primitives of the plurality of warning lights 710.

To mitigate this error using an inclusive region, a defined region 716 surrounding the 3D model of the car 712 is provided to the control module 608. The definition of the region may include the boundaries of a tile aligned bounding box. The defined region 716 is represented by bounding box 806 on the screen space 800. The control module 608 further receives the verification data regarding the primitives of objects (here the car 712) within the defined region 716.

The control module 608 would use the definition of the region 716 received to identify the tiles that fall within the defined region. Further the control module checks the output of the tiling logic 606 for each tile and determines if the tiles comprising primitives represented by the verification data fall outside the bounding box 806. In this case, the corrupted primitives of the car shown by triangle 804 are allocated to a number of tiles outside the region defined by the bounding box 806. Therefore, the control module removes those primitives from the list of primitives allocated to the tiles outside the bounding box 806. The output of the control module including the list of primitives falling within each tile is provided to the control stream generator module 610.

In a second implementation, one or more regions that need to be protected from corruption, which are referred to hereinafter also as exclusive regions, are provided to the tiling logic. In some cases an indication of one or more region among multiple regions that are enabled and the indication that the test is exclusive may be provided to the tiling logic. In such cases, the control module 608 controls the rendering of the frame and prevents corruption inside of a defined region by excluding any primitives other than the primitives associated with the defined region (represented by the verification data) from the tile control stream for the defined region. The controlling of the rendering comprises checking, if any tile that falls within the defined region comprises primitives not identified by the verification data. The checking is performed by comparing the vertices of the tiles to the vertices of the defined region, to identify if any tiles comprising primitives not identified by the verification data fall within the vertices of the region defined.

In other words, primitives not included in the verification data for the defined region are prevented from being rendered inside the defined region. So, if an error during the geometry processing phase would otherwise lead to a primitive from outside the defined region being erroneously included in a control stream for inside the defined region, the control module can use the verification data to prevent that from happening. The control module 308 controls the rendering of the frame, so that the rendering excludes, from the frame inside the defined region, the primitives that not identified by the verification data.

Figure 7B:
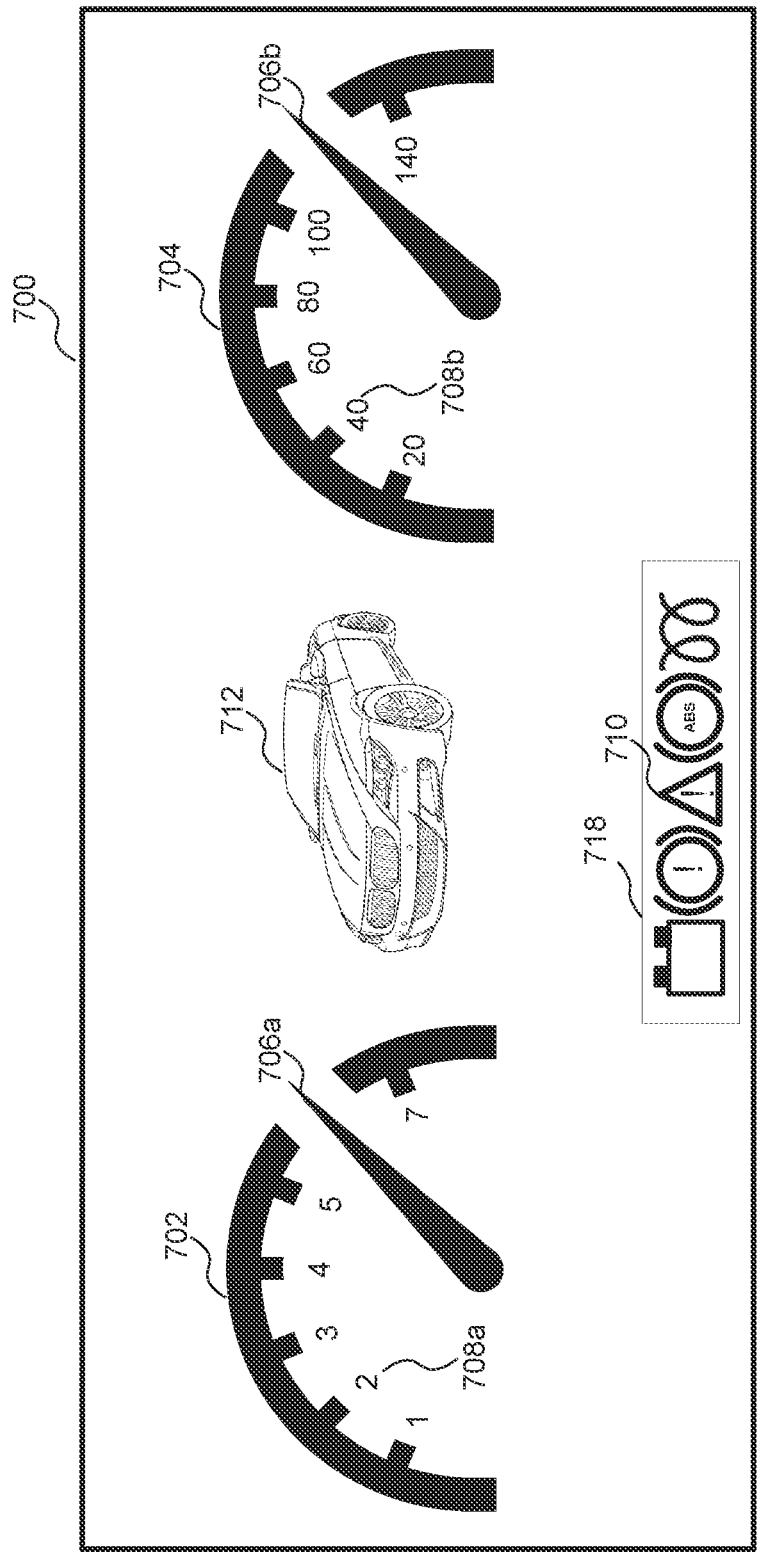
FIG. 7*b* illustrates a digital instrument cluster with an exclusive region defined.

To better understand the second implementation, consider the example given in FIG. 7*b* and FIG. 8. FIG. 7*b* is similar to FIG. 7*a* except that the defined region is an exclusive region 718 around the plurality of warning lights 710. An exclusive region can be defined when it is clearly known which regions in the frame need to be protected from corruption. In such a case, an error within the exclusive region, caused by a vertex explosion outside the exclusive region, can be eliminated and the critical elements in the frame may be protected by preventing the corruption of the defined region. To achieve this, the defined region and verification data which include the information about the primitives of the plurality of warning lights 710 are provided to the control module 608.

Thus, the control module 608 receives the determination of the primitives falling within each tile, from the tiling logic 606, the verification data (e.g. as state data) and the defined region from the API 604. The control module 608 checks the output of the tiling logic 606 for each tile and determines if any tile comprising primitives not represented by the verification data as being expected in the defined region falls within the defined region. If the control module identifies that any tile comprising primitives not represented by the verification data as being present in the defined region falls within the defined region, the control module removes those primitives from the list of primitives allocated to the tiles within the defined region. In another case, when the control module 608 identifies that any tile comprising primitives not represented by the verification data as being expected in the defined region falls within the defined region, the control module 608 may generate a new list of primitives for the tiles within the defined region, not including any primitives other than those represented by the verification data as being present in the defined region. The output of the control module including the list of primitives falling within each tile is provided to the control stream generator module 610.

Consider the same example given above in FIG. 8, where one or more vertices of any of the primitives of the 3D model of the car 802 explodes and spread across the tiles on the screen spaces. The area covered by the vertices of the primitives of the corrupted 3D model is represented by the triangle 804. As the vertices of the primitives of the 3D model exploded, the output of the tiling logic received by the tiling logic 606 would associate the primitives of the car 712 with all the tiles covered by the triangle 804 including the set of tiles in the defined region 718 surrounding the primitives of the plurality of warning lights 710.

To mitigate this error using an exclusive region, a defined region 718 surrounding the warning lights 710 is provided to the control module 608. The control module 608 would use the definition of the region 718 received to identify the tiles that fall within the defined region. The defined region 718 is represented by a bounding box 810 on the screen space 800. The control module 608 further receives the verification data regarding the primitives within the defined region 718.

Further the control module checks the output of the tiling logic 606 for each tile and determines if any tile comprising primitives not represented by the verification data as being present in the defined region falls inside the bounding box 810. In this case as the primitives of the car 712 have become erroneously allocated to the tiles inside the region defined by the bounding box 810, the control module excludes those primitives from the list of primitives allocated to the tiles inside the bounding box 810. The output of the control module including the list of primitives falling within each tile is provided to the control stream generator module 610.

FIGS. 7a and 7b described above have been illustrated for a tile based system where the tile boundary is the same as the 'region' boundary, but in some other cases the tile and region boundaries may not be aligned, or the region boundaries may not be tile based at all.

There could be various ways by which the functionality of the control module 608 could be implemented. One way could be by implementing a plurality of comparators in the control module 608. The plurality of comparators may compare the vertices of a tile comprising primitives represented by the verification data with the vertices of the defined region by the tiling logic 606 and determines whether to include or exclude a primitive from a list of primitives associated with the tile.

An example of the test performed by the control module using the comparators is detailed below. The control module checks using the comparators, each tile comprising primitives identified by the verification data, whether the tile falls inside or outside the defined region. The primitives identified by the verification data may be present in many tiles. The test is performed for each tile comprising the primitives identified by the verification data.

A truth table for the test logic in the control module may be as given below. The first column indicates whether the tile comprising the primitive associated with the verification data is inside the region or not. The second column indicates if the region is inclusive or exclusive. The last column indicates if the test is satisfied based on these conditions. The test logic performs an XOR operation.

| Inside | Region | Pass |
| --- | --- | --- |
| 0 | 0 (Inclusive) | 0 |
| 0 | 1 (Exclusive) | 1 |
| 1 | 0 (Inclusive) | 1 |
| 1 | 1 (Exclusive) | 0 |

Pseudo-code for this test may be as given below:

```
// Assume a coordinate system as shown in Fig. 8, and region boundaries aligned to the tile grid.
// Let tileX and tileY be the XY coordinates for the tile covered by a primitive.
// A primitive may touch multiple tiles. The test will be performed for every tile the primitive touches.
// Let tileRegion Min/Max X/Y define the AABB of the region
// Let "regionTest" be encoded such that 0 = Inclusive, 1 = Exclusive
// Test whether the tile is inside a protection region using 4 comparators.
Is InsideRegion = tileX >= tileRegionMinX AND tileX <= tileRegionMaxX AND tileY >= tileRegionMinY AND tileY <= tileRegionMaxY;
// the XOR operation matches the truth table above.
allowToProgess = isInsideRegion XOR regionTest;
// There may be multiple protection regions, in which case the test could iterate over each region
```

One way of identifying which primitives should be included in the verification data is by using draw calls. A draw call is a mechanism, provided by the API, by which the application can submit data for display. The application may represent each object using one or more primitives (i.e. simple geometric shapes, such as, but not limited to rectangles, triangles, lines and points to which a texture can be applied) which are defined by the position of one or more vertices. Consider each primitive is represented by a triangle and all the triangles forming all or part of one object may share a common state. Having the common state means each triangle has common drawing modes, textures, shader programs, etc. A draw call will be made by the application providing the information needed to render one group of primitives having the same state. Hence each object in the frame will be associated with a different draw call or a set of draw calls. In other words, returning to the example of FIGS. 7a & 7b, the primitives of the 3D car model might be associated with different draw calls to the draw calls used for the plurality of warning lights. The draw calls could thus identify whether or not the associated primitives relate to safety critical display elements, which the API can then use to construct the relevant defined regions (be they defined inclusively or exclusively) to which to associate the corresponding primitives as verification data accordingly. The indication of whether or not the associated primitives relate to safety critical display elements may be added to the state information used by the draw call.

For example, the control module 608 receives the bounding box defining the region 718 or region 716 provided by the API (maybe via the software driver). The bounding box would then be applied to all the primitives drawn in the draw call, and perhaps to any subsequent draw calls until all the primitives from the list of primitives for each tile is changed based on the verification data.

The verification data for checking might be obtained using a sequence of function calls (commands) from the application via the API to the driver.

A (simplified) example sequence might look as given below. Initially, some states for the primitives are enabled. Once the states are enabled the primitives are obtained using a sequence of commands such as glDraw. The command glDraw draws primitives with the same state. Further the region can be defined using commands glSetProtectionRegion by providing the boundaries such as min X,Y and Max X and Y. Further, one or more of the defined regions can be enabled by a command such as glEnablei to use the enabled region for testing and protecting the rendering of the safe geometry elements.

```
glEnable(SOME_STATE);
glDraw(SOME_PRIMITIVES);              // this is a "draw call"
glDraw(SOME_PRIMITIVES);
glSomeFunction( );
glSetProtectionRegion(0, MIN_X, MAX_X, MIN_Y, MAX_Y); // new function exposed via the
API to allow applications to set protection regions, this sets region 0
glSetProtectionRegion(1, MIN_X, MAX_X, MIN_Y, MAX_Y); // this sets region 1
glEnablei(PROTECTION_REGION, 0);      // enable protection region 0 that we've
just setup
glEnablei(PROTECTION_REGION, 1);      // enable protection region 1 that we've
just setup
// the driver would convert the protection regions from pixel co-ordinates into tile co-ordinates
// and send the 2 protection region AABBs to the tiling engine hardware
glDraw(SOME_PRIMITIVES);
```

So, the state (the AABBs and enable bits) associated with each draw call will determine which protection regions (if any) are enabled and therefore which primitives (generated by the draw calls) are tested against the protection regions.

In the example above, the first two draw calls appear before the application enables any protection region, so the tiling engine won't test the tiles touched by the primitives generated by those draw calls. The third draw call appears after the application enables two protection regions, so the tiling engine would test every tile that is covered by every primitive from the draw call against the enabled protection regions.

The control stream generator module 610 further generates a tile control stream based on the output from the control module. The control stream generator module 610 generates control stream data based on the determination of the control module 608, to prevent the corruption of the safety critical elements within the scene while rendering.

The control stream generator 610 receives the results output by the tiling logic 610 and details of the primitives to be removed from the primitive block associated with each tile from the control block. Then the control stream generator 610 is configured to, (i) generate a primitive block entry and (ii) store the generated primitive block entry in memory 614 as part of a control stream for the group of tiles based on the output from the control module. Thus in the inclusive implementation where the defined region is surrounding (for example) the 3D model of the car, the control stream generator places the pointers to the primitives in the primitive blocks representing the 3D model as a part of control stream for only the tiles within the defined region. Thus, the control stream generated by the control stream generator enables controlling the rendering of the frame, so that the rendering excludes, from the frame outside the defined region, the primitives identified by the verification data.

Further if the implementation is for an exclusive region where the defined region surrounds the plurality of the warning light indicators that needs to be protected, the control stream generator eliminates the primitive blocks having the primitives representing (for example) the 3D model from being a part of control stream for those tiles within the defined region and places only the primitive blocks having the primitives which are represented by the verification data. Thus the control stream generated by the control stream generator enables controlling the rendering of the frame, so that the rendering excludes, from the frame inside the defined region, the primitives that are not identified by the verification data.

The primitive block entry for a primitive block may comprise a valid tile information (e.g. a valid tile mask with a bit per tile within a tile group (group of tiles) identifying which of the tiles in the tile group are valid for the primitive block; and a data pointer that points to the corresponding primitive block in memory 614. A primitive block entry may also comprise a primitive block header which may include additional information about the primitive block.

Further, in some cases the control stream may be stored in memory in control stream entry blocks where each block has a maximum number of entries. In these cases, the control stream generator 610 may be configured to build a control stream block by adding the entries to the control stream block until the maximum number of entries has been reached. Once the maximum number of entries less one has been reached the control stream generator 610 may be configured to add a link entry to the control stream block indicating where the next control stream block will be stored in memory, and then write the control stream block to memory. The control stream generator 610 may be configured to continue to build control stream blocks until the last primitive block entry has been generated.

In some cases, the control stream generator 610 may be configured to, once it has generated the last primitive block entry for the tile group, store a termination entry (as described above) in memory to indicate the end of the control stream for that tile group.

The output of the control stream generator is stored in the memory 614b (such as in a region of the parameter buffer memory). The memory 614b corresponds to the memory 202$_3$ in FIG. 2. The output stored in the memory 614b can be further used by the rendering unit which is the rasterization logic 206. The rendering unit configured to render the frame using the geometry data based on the output of the rendering control unit. Thus, in case of defining an inclusive region as discussed in detail above, the rendering control unit controls the rendering such that the rendering unit while rendering the frame excludes, from the frame outside the defined region, the primitives identified by the verification data. Similarly, in case of defining an exclusive region, the rendering control unit controls the rendering such that the rendering unit while rendering the frame excludes, from the frame inside the defined region, the primitives that not identified by the verification data.

Figure 9:
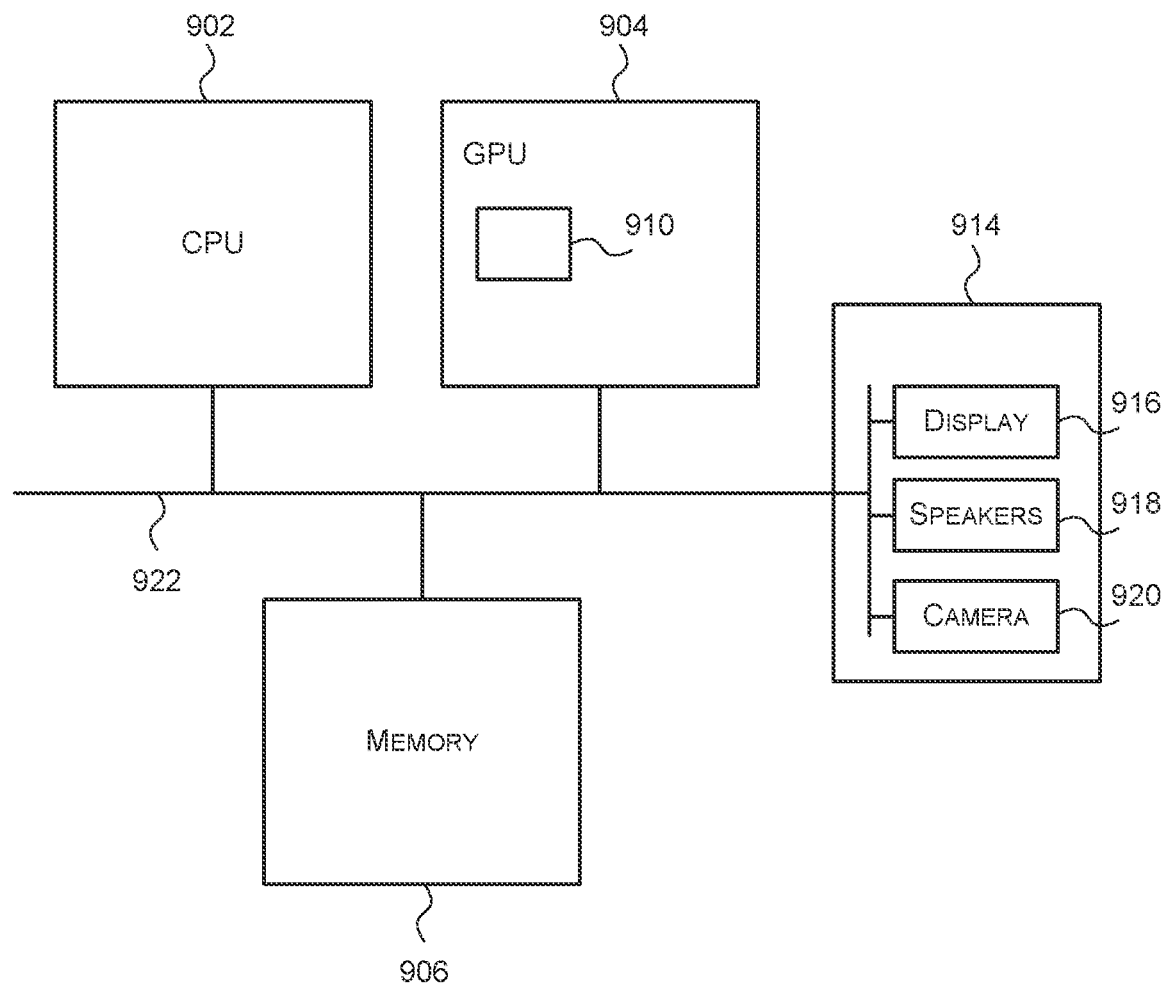
FIG. 9 shows a computer system in which a graphics processing system is implemented.

FIG. 9 shows a computer system in which the graphics processing systems described herein may be implemented. The computer system comprises a CPU 902, a GPU 904, a memory 906 and other devices 914, such as a display 916, speakers 918 and a camera 922. A processing block 910 (corresponding to processing blocks 110) is implemented on the GPU 904, as well as a Neural Network Accelerator (NNA) 911. In other examples, the processing block 910 may be implemented on the CPU 902 or within the NNA 911. The components of the computer system can communicate with each other via a communications bus 920. A store 912 (corresponding to store 112) is implemented as part of the memory 906.

While FIG. 9 illustrates one implementation of a graphics processing system, it will be understood that a similar block diagram could be drawn for an artificial intelligence accelerator system—for example, by replacing either the CPU 902 or the GPU 904. The processing block 910 can be implemented in the NNA.

The graphics processing system 600 of FIG. 6 is shown as comprising a number of functional blocks. This is schematic only and is not intended to define a strict division between different logic elements of such entities. Each functional block may be provided in any suitable manner. It is to be understood that intermediate values described herein as being formed by a tiling engine 602 need not be physically generated by the tiling engine 602 at any point and may merely represent logical values which conveniently describe the processing performed by the tiling engine 602 between its input and output.

The graphics processing system 600 described herein may be embodied in hardware on an integrated circuit. The graphics processing system 600 described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a tiling engine 602 configured to perform any of the methods described herein, or to manufacture a tiling engine 602 comprising any apparatus described herein. An integrated circuit definition dataset may be, for example, an integrated circuit description.

Therefore, there may be provided a method of manufacturing, at an integrated circuit manufacturing system, a graphics processing system 600 as described herein. Furthermore, there may be provided an integrated circuit definition dataset that, when processed in an integrated circuit manufacturing system, causes the method of manufacturing a graphics processing system 600 to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a graphics processing system 600 will now be described with respect to FIG. 10.

Figure 10:
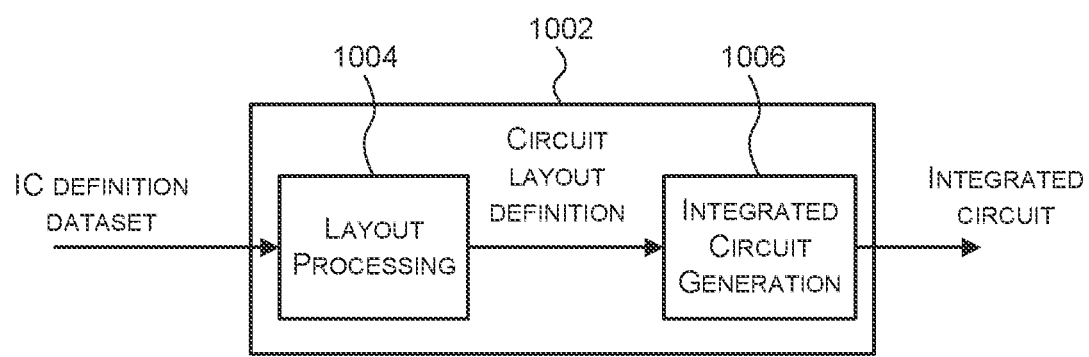
FIG. 10 shows an integrated circuit manufacturing system for generating an integrated circuit embodying a graphics processing system.

FIG. 10 shows an example of an integrated circuit (IC) manufacturing system 1002 which is configured to manufacture a graphics processing system 600 as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a graphics processing system 600 as described in any of the examples herein), process the IC definition dataset, and generate an IC according to the IC definition dataset (e.g. which embodies a graphics processing system 600 as described in any of the examples herein).

The processing of the IC definition dataset configures the IC manufacturing system 1002 to manufacture an integrated circuit embodying a graphics processing system 600 as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a tiling engine, rendering control unit, a rendering unit or a graphics processing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 10 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of performing safety-critical rendering of a frame in a tile based graphics processing system, the method comprising:
   receiving, at a rendering control unit, geometry data for the frame, a definition of a region in the frame and verification data, wherein the geometry data for the frame includes data defining a plurality of primitives representing a plurality of objects in the frame;
   the region being associated with one or more primitives among the plurality of primitives;
   the verification data associating one or more primitives with the region in the frame; and
   rendering the frame using the geometry data and controlling the rendering of the frame using the verification data, so that the rendering excludes, from the frame outside the region, the primitives identified by the verification data.

2. The method as claimed in claim 1, wherein the controlling comprises checking, whether a tile comprising primitives identified by the verification data, falls entirely within the region.

3. The method as claimed in claim 1, wherein the geometry data and the verification data are received together.

4. The method as claimed in claim 1, wherein the region is an axis aligned bounding box, within the frame, and/or wherein the definition of the region in the frame includes location of vertices of the region in the frame.

5. The method as claimed in claim 1, wherein on receiving geometry data for the frame, the method comprises:
generating one or more primitive blocks, each primitive block comprising one or more primitives among the plurality of primitive grouped together; and
associating, each tile among a plurality of tiles on the frame, with primitive blocks comprising at least one primitive that falls, at least partially, within the bounds of the tile.

6. The method as claimed in claim 5, wherein the method comprises controlling the rendering by:
generating a control stream data for each tile among the plurality of tiles on the frame identifying the primitives falling on the tile; and
excluding from the control stream data, for each tile outside the region, pointers to the primitive blocks comprising primitives identified by the verification data.

7. The method as claimed in claim 1, wherein the primitives that are covered by the region represents multi-dimensional objects.

8. The method as claimed in claim 1, wherein the frame comprises one or more safety critical objects outside the defined region.

9. The method as claimed in claim 1, wherein the verification data is received from an application.

10. The method as claimed in claim 1, further comprising receiving definitions of multiple regions, wherein the verification data associates one or more primitives with each of the multiple regions, and wherein controlling the rendering of the frame using the verification data, excludes, from the frame outside the regions, the primitives identified by the verification data for each region.

11. The method as claimed in claim 1, wherein the method further comprises:
receiving a definition of a second region in the frame, the region being associated with one or more primitives among the plurality of primitives;
receiving verification data for the second region that identifies one or more primitives associated with the region in the frame; and
rendering the frame using the geometry data and controlling the rendering of the frame using the verification data, so that the rendering excludes, from the frame inside the region, the primitives not identified by the verification data.

12. A tile based graphics processing system enabling safety-critical rendering of a frame, the system comprising:
a rendering control unit configured to:
receive geometry data for the frame, including data defining a plurality of primitives representing a plurality of objects in the frame;
receive a definition of a region in the frame, the region being associated with one or more primitives among the plurality of primitives;
receive verification data that associates one or more primitives with the region in the frame; and
control the rendering of the frame using verification data, so that the rendering excludes, from the frame outside the defined region, the primitives identified by the verification data; and
a rendering unit configured to render the frame using the geometry data based on the output of the rendering control unit.

13. The system as claimed in claim 12, wherein the rendering control unit comprises a control module configured to check whether a tile comprising primitives identified by the verification data, falls entirely within the region.

14. The system as claimed in claim 13, wherein the rendering control unit comprises a primitive block generator configured to receive the geometry data for the frame and verification data and generate one or more primitive blocks, each primitive block grouping together one or more primitives among the plurality of primitives.

15. The system as claimed in claim 14, wherein the rendering control unit comprises a tiling logic configured to:
receive the one or more primitive blocks and the geometry data from the primitive block generator; and
associate each tile among the plurality of tiles on the frame, with primitive blocks that comprises at least one primitive that falls, at least partially, within the bounds of the tile.

16. The system as claimed in claim 15, wherein the rendering control unit comprises a control stream generator configured to:
generate the control stream data for each tile among the plurality of tiles on the frame to render the image; and
control the rendering of the frame by excluding from the control stream data, for each tile outside the region, the pointers to the primitive blocks associated with the primitives identified by the verification data.

17. The system as claimed in claim 13, wherein the control module receives the definition of the region in the frame comprising the location of vertices of the region.

18. The system as claimed in claim 12, wherein the tile based graphics processing system is embodied in hardware on an integrated circuit.

19. A non-transitory computer readable storage medium having stored thereon computer readable code configured to cause the method of claim 1 to be performed when the code is run.

* * * * *